(12) United States Patent
Nishimiya et al.

(10) Patent No.: US 11,539,314 B2
(45) Date of Patent: Dec. 27, 2022

(54) ELECTRIC WORKING MACHINE

(71) Applicant: MAKITA CORPORATION, Anjo (JP)

(72) Inventors: Takeshi Nishimiya, Anjo (JP); Hidekazu Suda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 16/462,675

(22) PCT Filed: Nov. 22, 2017

(86) PCT No.: PCT/JP2017/042051
§ 371 (c)(1),
(2) Date: May 21, 2019

(87) PCT Pub. No.: WO2018/097194
PCT Pub. Date: May 31, 2018

(65) Prior Publication Data
US 2020/0067435 A1    Feb. 27, 2020

(30) Foreign Application Priority Data

Nov. 24, 2016    (JP) .............................. JP2016-228009

(51) Int. Cl.
*H02P 6/16*    (2016.01)
*H02P 6/12*    (2006.01)
(Continued)

(52) U.S. Cl.
CPC ................ *H02P 6/30* (2016.02); *B23D 47/12* (2013.01); *B23D 59/001* (2013.01); *H02P 6/12* (2013.01);
(Continued)

(58) Field of Classification Search
None
See application file for complete search history.

(56) References Cited

U.S. PATENT DOCUMENTS 2,261,230 A * 11/1941 Cox .................... B23D 57/0076
606/180
2,714,905 A * 8/1955 Clayton ................. B27G 19/04
30/374
(Continued)

FOREIGN PATENT DOCUMENTS

CN    2891435 Y    4/2007
CN    105269506 A    1/2016
(Continued)

OTHER PUBLICATIONS

May 28, 2019 International Preliminary Report on Patentability issued in International Patent Application No. PCT/JP2017/042051.
(Continued)

*Primary Examiner* — Clark F Dexter
(74) *Attorney, Agent, or Firm* — Oliff PLC

(57) ABSTRACT

An electric working machine in one aspect of the present disclosure includes: a motor; a driver to drive the motor; a first control circuit; and a second control circuit. The first control circuit controls the driver such that the motor rotates in a set rotation direction. The second control circuit is provided separately from the first control circuit. The second control circuit detects a rotation direction of the motor and performs an abnormality handling process to stop rotation of the motor in response to a situation where the detected rotation direction is reverse to the set rotation direction.

7 Claims, 8 Drawing Sheets

(51) Int. Cl.
*H02P 6/24* (2006.01)
*B23D 45/16* (2006.01)
*B23D 47/12* (2006.01)
*B23D 59/00* (2006.01)
*B23Q 11/00* (2006.01)
*B27G 19/04* (2006.01)
*H02P 6/30* (2016.01)

(52) U.S. Cl.
CPC .................. *H02P 6/16* (2013.01); *H02P 6/24* (2013.01); *B23D 45/16* (2013.01); *B23Q 11/0092* (2013.01); *B27G 19/04* (2013.01)

(56) References Cited

U.S. PATENT DOCUMENTS

| | | | | |
|---|---|---|---|---|
| 3,042,089 | A * | 7/1962 | Lyons | B27B 5/08 30/373 |
| 3,056,439 | A * | 10/1962 | Hall et al. | B25F 3/00 144/1.1 |
| 3,260,289 | A * | 7/1966 | Whitten, Jr. | B23D 51/10 30/392 |
| 3,334,287 | A * | 8/1967 | Jensen | B66C 15/00 318/369 |
| 4,760,643 | A * | 8/1988 | Juma | B23B 51/0426 144/218 |
| 4,949,463 | A * | 8/1990 | Chen | B23D 49/162 144/136.1 |
| 5,371,947 | A * | 12/1994 | Dickey et al. | B23D 45/126 30/122 |
| 5,607,265 | A * | 3/1997 | Lane | B23D 51/16 144/35.2 |
| 2009/0071671 | A1 * | 3/2009 | Zhong et al. | B23B 45/008 173/176 |
| 2014/0166323 | A1 * | 6/2014 | Cooper | F16P 3/148 173/1 |
| 2015/0355280 | A1 * | 12/2015 | Iwata | H01M 10/48 173/2 |

FOREIGN PATENT DOCUMENTS

| | | |
|---|---|---|
| EP | 2826604 A1 | 1/2015 |
| JP | 2005-117840 A | 4/2005 |
| JP | 2007-106180 A | 4/2007 |
| JP | 2008-278633 A | 11/2008 |
| JP | 2013-188825 A | 9/2013 |
| JP | 2015-013327 A | 1/2015 |
| JP | 2016-187853 A | 11/2016 |

OTHER PUBLICATIONS

Jul. 28, 2020 Office Action issued in Japanese Patent Application No. 2016-228009, with translation.

Jan. 23, 2018 International Search Report Issued in International Patent Application PCT/JP2017/042051.

Sep. 3, 2021 Office Action issued in Chinese Patent Application No. 201780072590.0.

May 25, 2022 Office Action issued in Chinese Patent Application No. 201780072590.0.

* cited by examiner

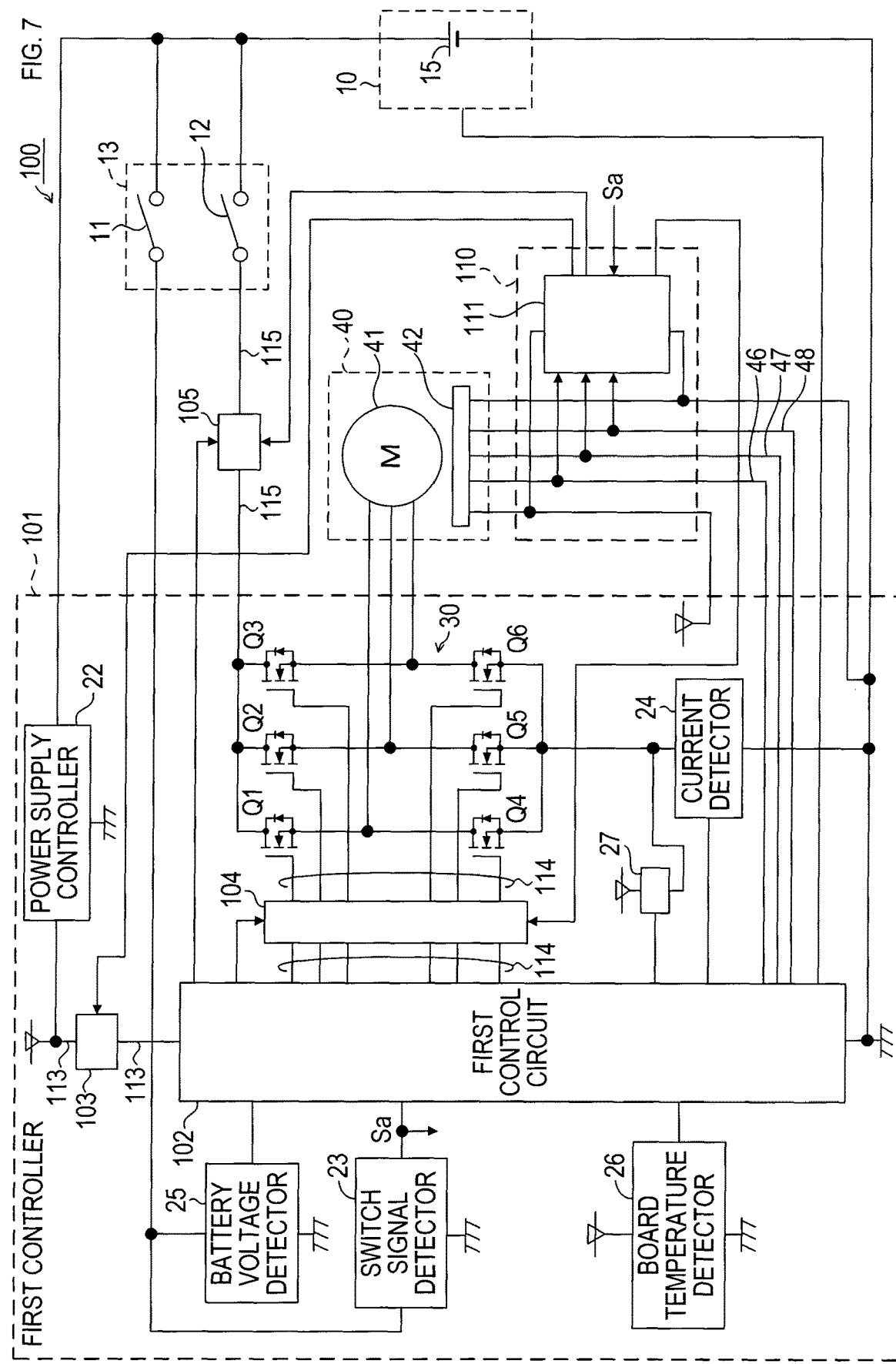

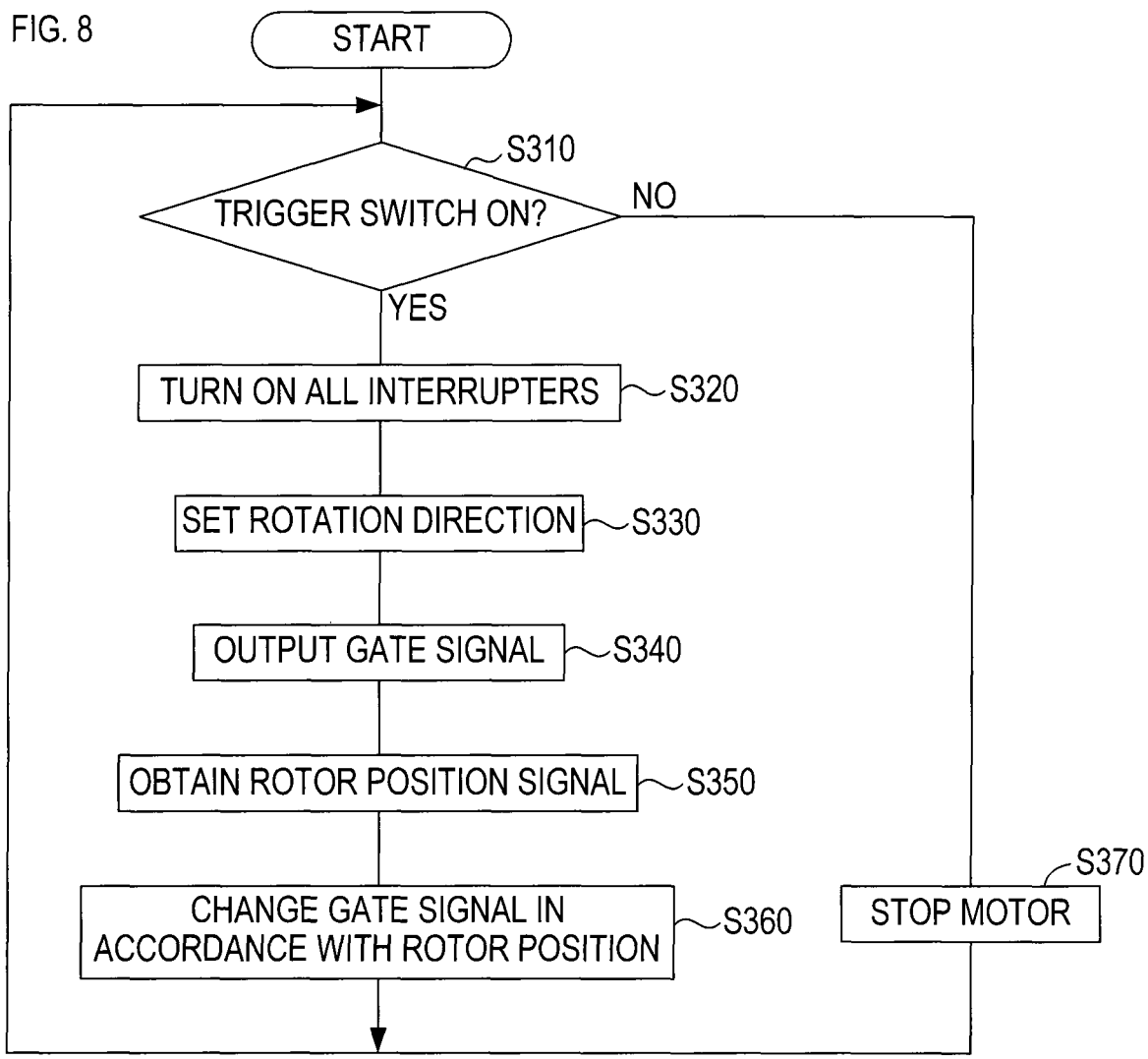

ELECTRIC WORKING MACHINE

CROSS-REFERENCE TO RELATED APPLICATION

This international application claims the benefit of Japanese Patent Application No. 2016-228009 filed on Nov. 24, 2016 with the Japan Patent Office, and the entire disclosure of Japanese Patent Application No. 2016-228009 is incorporated herein by reference.

TECHNICAL FIELD

The present disclosure relates to a technique to control a motor in an electric working machine.

BACKGROUND ART

In an electric power tool disclosed in Patent Document 1 below, a control circuit determines a rotation direction of a motor based on a signal inputted from a forward-reverse switch that is operated by a user, and rotates the motor based on a detection signal from a Hall element to detect a rotor position.

PRIOR ART DOCUMENTS

Patent Documents

Patent Document 1: Japanese Unexamined Patent Application Publication No. 2013-188825

SUMMARY OF THE INVENTION

Problems to be Solved by the Invention

In the above-described electric power tool, if an abnormality occurs in the control circuit, thereby disabling normal control of the motor, the motor might rotate in a reverse direction to a set rotation direction.

If the motor rotates in the reverse direction to the set rotation direction, processing unintended by the user might be performed, or various influences might be caused on the user or the electric working machine itself.

In one aspect of the present disclosure, it is preferable to enable reduction in various influences that might be caused by rotation of a motor of an electric working machine in a reverse direction to a set rotation direction.

Means for Solving the Problems

An electric working machine in one aspect of the present disclosure includes: a motor; a driver; a first control circuit; and a second control circuit. The driver drives the motor by electric power supplied from a power source. The first control circuit controls the driver such that the motor rotates in a set rotation direction. The second control circuit is provided separately from the first control circuit. The second control circuit detects a rotation direction of the motor, and the second control circuit executes an abnormality handling process to stop rotation of the motor in response to a situation where the detected rotation direction is reverse to the set rotation direction.

In the electric working machine configured as described above, the second control circuit provided separately from the first control circuit monitors the rotation direction of the motor. The second control circuit executes the abnormality handling process if the motor rotates in the reverse direction. Thus, various influences that might be caused by the rotation of the motor in the reverse direction can be reduced.

The abnormality handling process may include any process. For example, the abnormality handling process may include a notification process of providing a specific notification to the first control circuit. Then, the first control circuit may stop rotation of the motor through the driver in response to execution of the notification process.

In this case, the motor can be stopped by a simple process that the second control circuit provides the specific notification to the first control circuit in response to a rotation of the motor in the reverse direction.

The electric working machine may further include at least one specified electric wiring and an interrupter. The at least one specified electric wiring is configured to be such that interruption of the at least one specified electric wiring during rotation of the motor by the driver causes the motor to stop rotation. The interrupter is provided to the at least one specified electric wiring and configured capable of interrupting the at least one specified electric wiring. Also, the abnormality handling process may include a process of interrupting the at least one specified electric wiring by the interrupter.

In this case, the motor can be stopped by a simple process of interrupting the at least one specified electric wiring in response to a rotation of the motor in the reverse direction.

The at least one specified electric wiring may include a drive wiring to supply electric power from the power source to the driver, and the driver may be configured to drive the motor by the electric power supplied from the power source through the drive wiring.

In this case, the motor can be stopped by a simple process of interrupting the drive wiring in response to a rotation of the motor in the reverse direction.

The at least one specified electric wiring may include a control wiring to output a control signal from the first control circuit to the driver, and the driver may be configured to drive the motor in accordance with the control signal inputted from the first control circuit through the control wiring.

In this case, the motor can be stopped by a simple process of interrupting the control wiring in response to a rotation of the motor in the reverse direction.

The electric working machine may further include a power supplier configured to generate a power-supply electric power to operate the first control circuit. The at least one specified electric wiring may include a power supply wiring to supply the power-supply electric power generated by the power supplier to the first control circuit. The first control circuit may be configured to operate by the power-supply electric power inputted from the power supplier through the power supply wiring, to thereby control the driver.

In this case, the motor can be stopped by a simple process of interrupting the power supply wiring in response to a rotation of the motor in the reverse direction.

The electric working machine may further include a position information outputter configured to output rotational position information indicating a rotational position of the motor. The first control circuit may be configured to control the driver based on the rotational position information outputted from the position information outputter, to thereby rotate the motor in the set rotation direction. Also, the second control circuit may be configured to detect the rotation direction of the motor based on the rotational position information outputted from the position information outputter.

In this case, the rotational position information outputted from the position information outputter is shared by the first control circuit and the second control circuit. Accordingly, a simplified configuration of the electric working machine can be achieved, as compared with a case where, for example, the second control circuit detects the rotation direction based on information that is independent from the rotational position information from the position information outputter.

The electric working machine may include a first controller including the first control circuit and a second controller including the second control circuit. The rotational position information outputted from the position information outputter may be inputted to the second controller. The second controller may be configured to output the rotational position information inputted from the position information outputter to the first controller. The first control circuit may be configured to control the driver based on the rotational position information inputted from the second controller, and the first control circuit may be configured to stop driving of the motor by the driver in response to stopping of input of the rotational position information from the second controller. Also, the abnormality handling process may include a process of stopping output of the rotational position information from the second controller to the first controller.

In this case, the motor can be stopped by a simple process of stopping output of the rotational position information from the second controller to the first controller in response to a rotation of the motor in the reverse direction.

The electric working machine may further include a direction selecting operation device configured to be operated to set the rotation direction of the motor to a first direction or a second direction. The set rotation direction may correspond to the rotation direction set by the direction selecting operation device.

In this case, the motor can be stopped by the abnormality handling process in response to a rotation of the motor in the reverse direction, regardless of which of the first direction and the second direction the set rotation direction is.

The electric working machine may further include an instruction operation device configured to be operated by an operator of the electric working machine to rotate the motor. The first control circuit and the second control circuit may be configured to operate in response to an operation of the instruction operation device.

In such electric working machine, monitoring of the rotation direction and a process based on results of the monitoring by the second control circuit are performed while rotation of the motor is instructed by the instruction operation device, and are not performed while stopping of the motor is instructed. Accordingly, as compared with a case where the second control circuit constantly operates to monitor the rotation direction, power consumption required for operation of the second control circuit can be reduced.

BRIEF DESCRIPTION OF THE DRAWINGS

FIG. 7 is a configuration diagram showing an electrical configuration of an electric working machine of a fourth embodiment.

FIG. 8 is a flowchart showing a motor control process of the fourth embodiment.

Figure 1:
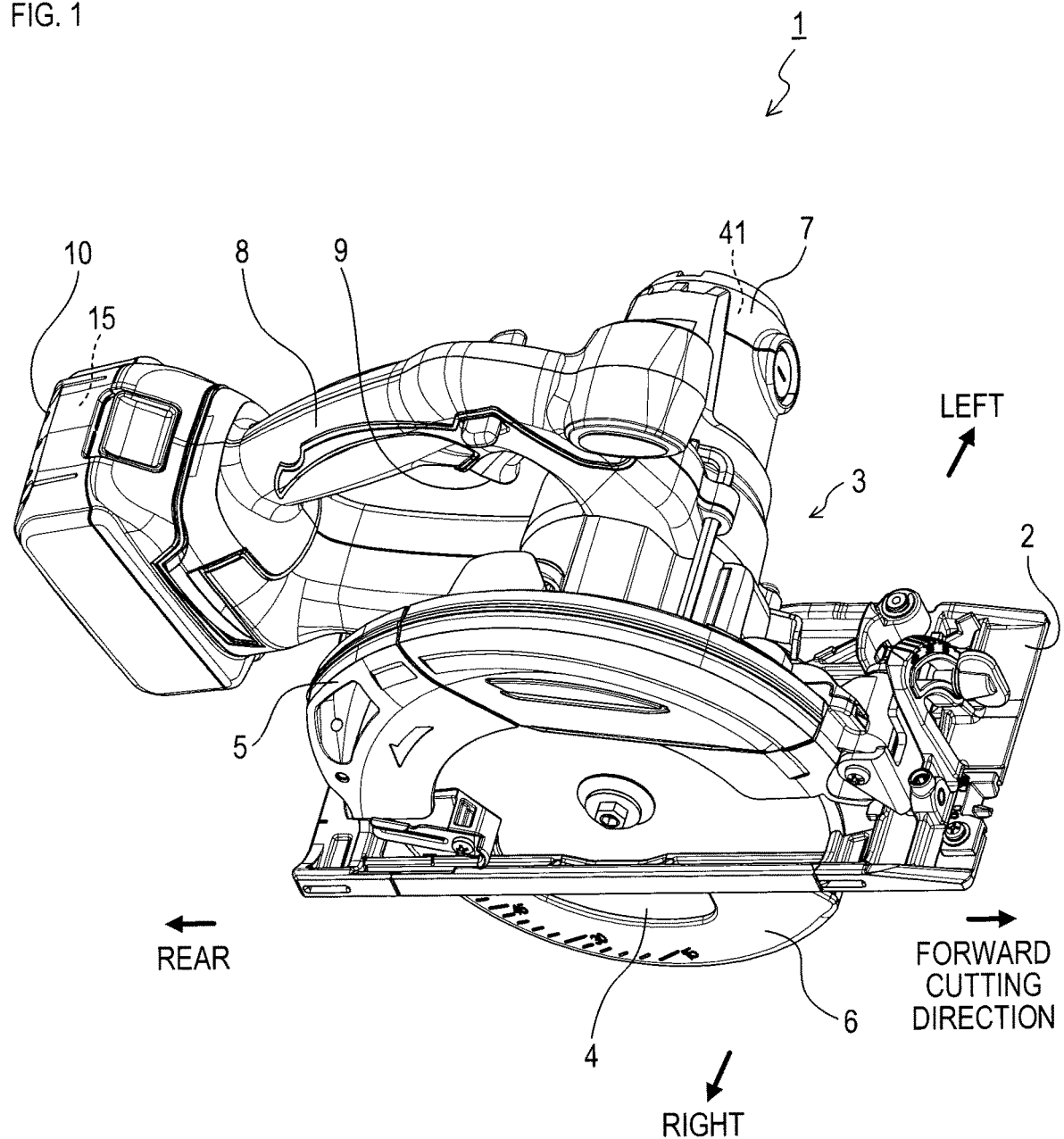
FIG. 1 is a perspective view showing an electric working machine of a first embodiment.

EXPLANATION OF REFERENCE NUMERALS 1, 70, 80, 100 . . . electric working machine; 9 . . . trigger operation portion; 10 . . . battery pack; 11 . . . first contact; 12 . . . second contact; 13 . . . trigger switch; 15 . . . battery; 20, 71, 81, 101 . . . first controller; 21, 72, 102 . . . first control circuit; 21a, 51a . . . CPU; 21b, 51b . . . memory; 22 . . . power supply controller; 23 . . . switch signal detector; 24 . . . current detector; 25 . . . battery voltage detector; 26 . . . board temperature detector; 27 . . . FET temperature detector; 30 . . . drive circuit; 40 . . . motor unit; 41 . . . motor; 42, 83 . . . rotor position detector; 46 . . . first signal line; 47 . . . second signal line; 48 . . . third signal line; 50, 75, 85, 110 . . . second controller; 51, 76, 86, 111 . . . second control circuit; 52 . . . first interrupter; 53 . . . second interrupter; 54 . . . third interrupter; 73 . . . forward/reverse selector switch; 103 . . . control power supply interrupter; 104 . . . gate signal interrupter; 105 . . . drive power supply interrupter; 113 . . . power supply wiring; 114 . . . gate signal wiring; 115 . . . drive wiring; Q1 to Q6 . . . semiconductor switching element.

MODE FOR CARRYING OUT THE INVENTION

Hereinafter, example embodiments of the present disclosure will be described with reference to the drawings.

1. First Embodiment (1-1) Overall Configuration of Electric Working Machine 1

As shown in FIG. 1, an electric working machine 1 of the present embodiment is configured as a circular saw to be used mainly for cutting a workpiece. The electric working machine 1 includes a base 2 and a main body 3. The base 2 is a substantially rectangular member that is brought into abutment with an upper surface of a workpiece to be cut during a cutting operation of the workpiece using the electric working machine 1. The main body 3 is arranged on an upper surface side of the base 2.

The main body 3 includes a circular saw blade 4, a saw blade case 5, and a cover 6. The saw blade 4 is arranged on a right side of the main body 3 in a forward cutting direction. The saw blade case 5 is provided to house and cover a peripheral edge of substantially an upper semicircular area of the saw blade 4.

The cover 6 is provided to cover a peripheral edge of substantially a lower semicircular area of the saw blade 4. The cover 6 is openable and closable, and FIG. 1 shows a state where the cover 6 is closed. By moving the electric working machine 1 in the forward cutting direction during cutting of the workpiece, the cover 6 pivots about a rotation center of the saw blade 4 in a counter-clockwise direction in the figure and is gradually opened. Accordingly, the saw blade 4 is exposed, and its exposed part is made to cut into the workpiece.

A substantially cylindrical motor case 7 is provided on a left side of the main body 3. The motor case 7 houses a motor 41. The motor 41 is a drive source of the electric working machine 1. A not-shown gear mechanism is housed between the motor case 7 and the saw blade 4. When the motor 41 rotates, the rotation is transmitted through the gear mechanism to the saw blade 4, and the saw blade 4 rotates.

A handle 8 to be gripped by a user of the electric working machine 1 is provided on an upper side of the main body 3. The handle 8 is mounted in an arch shape on the upper side of the main body 3. Specifically, a first end of the handle 8 is fixed to a rear end of the main body 3 along the forward cutting direction, and a second end of the handle 8 is fixed to a forward part of the main body 3 along the forward cutting direction relative to the first end of the handle 8.

A trigger operation portion 9 is provided to the handle 8. The user of the electric working machine 1 can perform a pull operation and a release operation of the trigger operation portion 9 while gripping the handle 8. By pressing a not-shown lock button while the trigger operation portion 9 is in a pull-operated state, the trigger operation portion 9 can be locked in the pull-operated state.

At the rear end of the main body 3, a battery pack 10 housing a repeatedly rechargeable battery 15 is detachably attached. It is configured such that when the trigger operation portion 9 is pull-operated while the battery pack 10 is attached to the main body 3, the motor 41 in the main body 3 rotates by electric power of the battery 15.

(1-2) Electrical Configuration of Electric Working Machine 1

Figure 2:
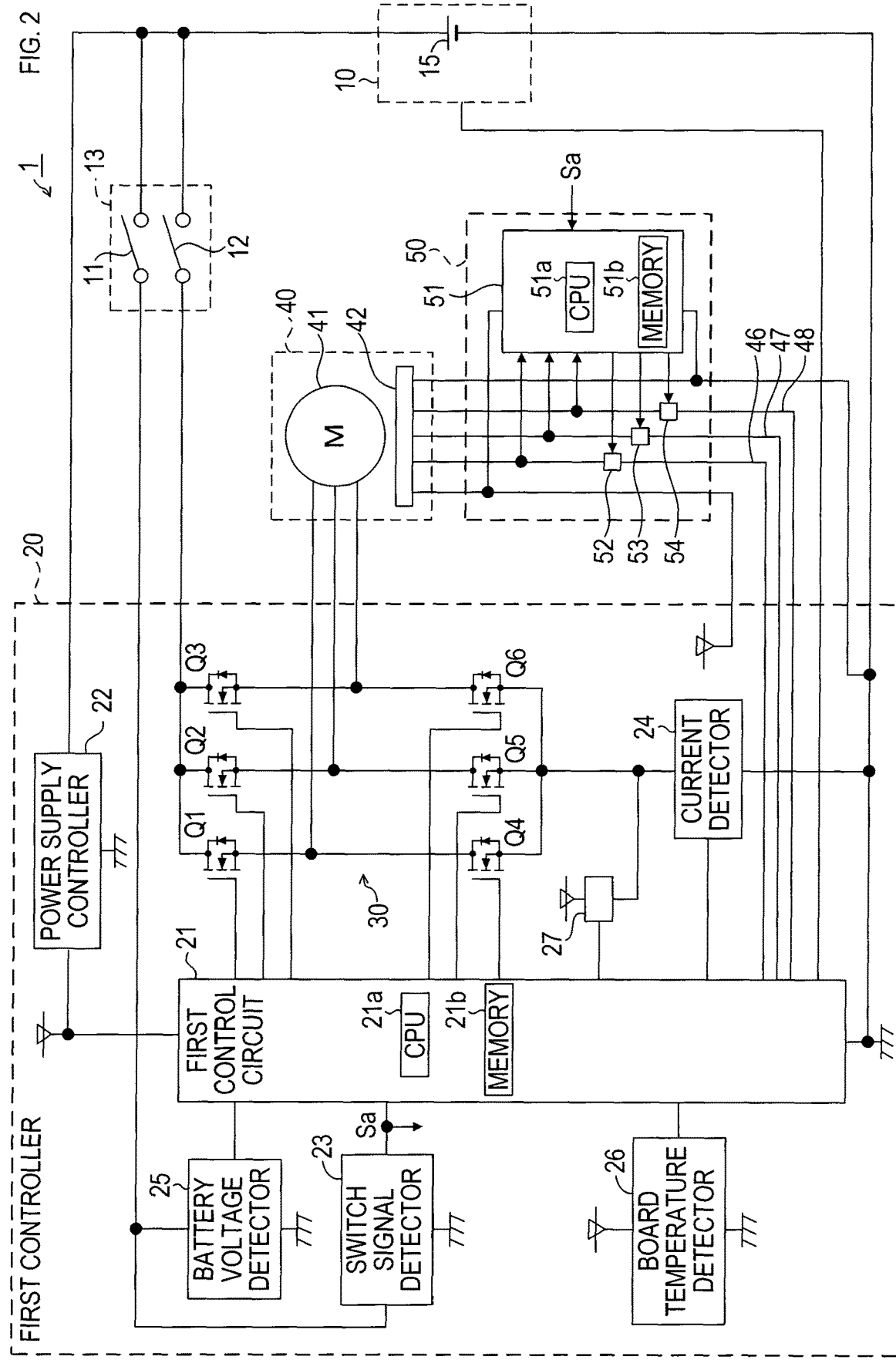
FIG. 2 is a configuration diagram showing an electrical configuration of the electric working machine of the first embodiment.

A description will be given of an electrical configuration of the electric working machine 1 using FIG. 2. As shown in FIG. 2, the electric working machine 1 includes a motor unit 40, a first controller 20, a second controller 50, and a trigger switch 13. Also, the electric working machine 1 includes the battery pack 10, which is also shown in FIG. 1. FIG. 1 shows a state where the battery pack 10 is attached to the main body 3.

The battery pack 10 houses the battery 15. The battery 15 of the present embodiment is, for example, a lithium ion rechargeable battery. However, the battery 15 may be a rechargeable battery other than a lithium ion rechargeable battery. The battery 15 can be charged by detaching the battery pack 10 from the electric working machine 1 and attaching the same to a not-shown charger.

The battery pack 10 is configured to be able to output battery state information indicating a state of the battery 15. The battery pack 10 may include, for example, a monitoring module for the battery 15. The monitoring module may be configured to detect abnormalities of the battery 15 and to output the detected abnormalities as the battery state information. Abnormalities of the battery 15 may include, for example, overcurrent, overdischarge, and overheat.

Also, for example, the battery pack 10 may be configured to detect physical quantities indicating a state of the battery 15, and to output information indicating the detected physical quantities as battery state information. The physical quantities indicating the state of the battery 15 may include, for example, a voltage value of the battery 15, voltage values of respective battery cells included in the battery 15, a value of current discharged from the battery 15, and a temperature of the battery 15.

The trigger switch 13 includes two contacts, which are a first contact 11 and a second contact 12. The trigger switch 13 is turned ON and OFF in an interlocked manner with the trigger operation portion 9 shown in FIG. 1. Specifically, when the trigger operation portion 9 is pull-operated, the trigger switch 13 is turned ON, that is, both of the first contact 11 and the second contact 12 are turned ON, and both of the first contact 11 and the second contact 12 are closed. On the other hand, in a state where the trigger operation portion 9 is not pull-operated, the trigger switch 13 is OFF, that is, both of the first contact 11 and the second contact 12 are OFF, and both of the first contact 11 and the second contact 12 are opened.

A first end of the first contact 11 and a first end of the second contact 12 are both coupled to a positive electrode of the battery 15. A second end of the first contact 11 and a second end of the second contact 12 are both coupled to the first controller 20.

The motor unit 40 includes the motor 41 and a rotor position detector 42. In the present embodiment, the motor 41 is a brushless motor configured to be driven by receiving supply of three-phase power.

The rotor position detector 42 is configured to output a signal in accordance with a rotational position of a rotor of the motor 41. In the description hereinafter, a rotational position with respect to the motor 41 specifically means a rotational position of the rotor.

The rotor position detector 42 includes three Hall sensors. The Hall sensors are arranged mutually spaced apart by an electrical angle of 120 degrees around the rotor of the motor 41. The three Hall sensors output respective first position signal, second position signal, and third position signal. These three position signals are signals each according to a relative positional relationship between a corresponding one of the Hall sensors and the rotor of the motor 41. The Hall sensors each include a Hall element and a signal process circuit that processes and converts an output signal from the Hall element into a binary digital signal. The binary digital signal is outputted as the position signal.

The first position signal to the third position signal outputted from the rotor position detector 42 are inputted to a first control circuit 21 in the first controller 20. More specifically, the first position signal is inputted to the first control circuit 21 through a first signal line 46, the second position signal is inputted to the first control circuit 21 through a second signal line 47, and the third position signal is inputted to the first control circuit 21 through a third signal line 48.

The three signal lines 46 to 48 pass through the second controller 50 between the motor unit 40 and the first controller 20. That is, the position signals outputted from the Hall sensors of the rotor position detector 42 are inputted to the first control circuit 21 through the second controller 50.

A control power supply voltage is inputted to the rotor position detector 42 from the first controller 20. Each of the Hall sensors in the rotor position detector 42 operates by using the control power supply voltage inputted from the first controller 20 as the power supply. Also, a ground terminal of each of the Hall sensors is coupled to the ground line that has an equal potential to a negative electrode of the battery 15.

In the present embodiment, the supply of a control power supply voltage from the first controller 20 to the rotor position detector 42, and coupling between the rotor position detector 42 and the ground line are configured to be through the second controller 50; however, these need not be performed through the second controller 50. For example, the control power supply voltage may be supplied from the first controller 20 directly to the rotor position detector 42 without passing through the second controller 50. Also, for example, the rotor position detector 42 may be directly coupled to the ground line without passing through the second controller 50.

The first controller 20 is a main controller to control driving of the motor 41. The first controller 20 includes the first control circuit 21, a drive circuit 30, and a switch signal detector 23.

The drive circuit 30 is configured to supply a three-phase power to the motor 41 based on a battery power supplied from the battery 15 through the second contact of the trigger switch 13. The drive circuit 30 includes an inverter. The inverter includes three semiconductor switching elements Q1 to Q3 as so-called high-side switches, three semiconductor switching elements Q4 to Q6 as so-called low-side switches. Each of the semiconductor switching elements Q1 to Q6 in the present embodiment is a Metal Oxide Semiconductor Field-Effect Transistor (MOSFET). A gate signal is inputted from the first control circuit 21 to a gate of each of the semiconductor switching elements Q1 to Q6. The semiconductor switching elements Q1 to Q6 are each turned ON when the gate signal is inputted from the first control circuit 21.

The switch signal detector 23 is configured to detect an ON/Off state of the trigger switch 13, that is, an operated/non-operated state of the trigger operation portion 9. Specifically, the switch signal detector 23 is coupled to the second end of the first contact 11 of the trigger switch 13. When the trigger operation portion 9 is pull-operated to thereby turn ON the first contact 11, a voltage of the battery 15 is inputted to the switch signal detector 23 through the first contact 11.

While the voltage of the battery 15 is inputted, the switch signal detector 23 outputs a trigger-ON signal Sa indicating that the trigger switch 13 is ON. The trigger-ON signal Sa outputted from the switch signal detector 23 is inputted to the first control circuit 21, and is also inputted to a second control circuit 51 in the second controller 50.

The first control circuit 21 includes a one-chip microcomputer, including a CPU 21a, a memory 21b, and other components. The memory 21b includes various types of semiconductor memories, such as a RAM, a ROM, and a non-volatile memory. The memory 21b stores various programs and data to be read and executed by the CPU 21a in order to achieve various functions of the first controller 20. The programs stored in the memory 21b include a program of the motor control process in FIG. 3 as described below.

These various functions may be partly or entirely implemented in the first control circuit 21 by hardware including a combination of a logic circuit, an analog circuit, and the like, in place of or in addition to software. Also, the first control circuit 21 including the one-chip microcomputer is merely an example, and the first control circuit 21 may have various other configurations that allow implementation of the functions of the first control circuit 21.

While the trigger-ON signal Sa is not inputted from the switch signal detector 23, that is, while the trigger switch 13 is OFF, the first control circuit 21 turns OFF all of the semiconductor switching elements Q1 to Q6 of the drive circuit 30, to thereby stop the motor 41.

On the other hand, while the trigger-ON signal Sa is inputted from the switch signal detector 23, the first control circuit 21 rotationally drives the motor 41. Specifically, the first control circuit 21 detects the rotational position of the rotor based on the three position signals, that is, the first position signal to the third position signal, which are inputted from the rotor position detector 42. The first control circuit 21 performs individual ON/OFF control of the semiconductor switching elements Q1 to Q6 based on the detected rotational position, to thereby control an electric current flowing from the battery 15 to the motor 41 and rotate the motor 41.

In the present embodiment, the first control circuit 21 is configured to rotate the motor 41 in a preset specific rotation direction (hereinafter, the set rotation direction) while the trigger-ON signal Sa is inputted.

The electric working machine 1 may include an operation signal outputter that detects a pull-operation amount of the trigger operation portion 9, and outputs to the first control circuit 2 an operation signal indicating the detected pull-operation amount. In this case, the first control circuit 21 may be configured to control a rotational speed, a rotational torque, or the like of the motor 41 in accordance with the pull-operation amount of the trigger operation portion 9 indicated by the inputted operation signal.

The electric working machine 1 of the present embodiment is configured such that, while all the Hall sensors in the rotor position detector 42 normally operate and the position signals from the Hall sensors are normally inputted to the first control circuit 21, the three position signals to be inputted to the first control circuit 21 will not be at a specified signal level (for example, an H-level) at the same time. Note that although all the position signals might be instantaneously at the specified signal level when respective signal levels of the position signals change, such an instantaneous coincidence at the specified signal level is not regarded as "being at the specified signal level at the same time" here.

The first control circuit 21 is configured not to drive the motor 41 if a signal abnormal state has occurred in which all the position signals inputted from the rotor position detector 42 are at the specified signal level at the same time. That is, if the signal abnormal state has occurred, the first control circuit 21 turns OFF all of the semiconductor switching elements Q1 to Q6 even if the trigger switch 13 is ON, to thereby stop electric power supply to the motor 41. Embodiments of the signal abnormal state may include embodiments other than the one where all the position signals are at the specified signal level at the same time.

Also, the first control circuit 21 includes a protection function based on battery state information inputted from the battery pack 10. Specifically, the first control circuit 21 determines whether an abnormality occurs in the battery 15 based on the battery state information inputted from the battery pack 10. If it is determined that the battery 15 is in an abnormal state, the motor 41 is forcibly stopped even when the trigger switch 13 is ON.

Further, the first controller 20 includes a power supply controller 22, a current detector 24, a battery voltage detector 25, a board temperature detector 26, and an FET temperature detector 27.

The power supply controller 22 receives power supply from the battery and generates a direct-current control power supply voltage. Components in the first controller 20, including the first control circuit 21, operate using the control power supply voltage from the power supply controller 22 as a power supply. The control power supply voltage generated by the power supply controller 22 is also supplied to the second controller 50 as described above.

The current detector 24 is configured to detect an electric current flowing in the motor 41. The current detector 24 includes, for example, a shunt resistor arranged in a current conduction path from the battery 15 to the motor 41, and outputs to the first control circuit 21 a voltage across the shunt resistor as a detection signal indicating a current value of the electric current flowing in the motor 41. The current detector 24 including the shunt resistor is merely an example. The current detector 24 may be configured capable of outputting a detection signal in accordance with the current value of the electric current flowing in the motor 41.

The battery voltage detector 25 is configured to detect a battery voltage supplied from the battery 15 of the battery pack 10. The battery voltage detector 25, which is coupled to the second end of the first contact 11 of the trigger switch 13, outputs to the first control circuit 21 a detection signal in accordance with a value of the battery voltage inputted through the first contact 11.

The board temperature detector 26 is arranged in a vicinity of the first control circuit 21 to detect a temperature of the first control circuit 21. The board temperature detector 26 includes, for example, a thermistor arranged in the vicinity of the first control circuit 21, and outputs to the first control circuit 21 a detection signal in accordance with the detected temperature.

The FET temperature detector 27 is arranged in a vicinity of at least one of the semiconductor switching elements Q1 to Q6 in the drive circuit 30, in order to detect a temperature of the drive circuit 30. The FET temperature detector 27 includes, for example, a thermistor, and outputs to the first control circuit 21 a detection signal in accordance with the detected temperature.

The second controller 50 is an auxiliary controller to detect a rotation direction of the motor 41, and to conduct or interrupt the three signal lines 46 to 48 in accordance with the detection result.

The second controller 50 includes the second control circuit 51. The second control circuit 51 includes a one-chip microcomputer, including a CPU 51a, a memory 51b, and other components. The memory 51b includes various semiconductor memories, such as a RAM, a ROM, and a non-volatile memory. The memory 51b stores various programs and data to be read and executed by the CPU 51a in order to achieve various functions of the second controller 50. These various programs include a program for an abnormality monitoring process in FIG. 4 as described below.

These various functions may be partly or entirely implemented, in place of, or added to, software, by hardware having a combination of a logic circuit, an analog circuit, and the like in the second control circuit 51. Also, the second control circuit 51 including a one-chip microcomputer is merely an example, and the second control circuit 51 may have various other configurations that allow implementation of the functions of the second control circuit 51.

The second controller 50 also includes parts of the three signal lines 46 to 48 to transmit three position signals from the rotor position detector 42 to the first controller 20, a part of a wiring to supply the control power supply voltage from the first controller 20 to the rotor position detector 42, and a part of a wiring to couple the rotor position detector 42 and the ground line.

The second controller 50 of the present embodiment includes a circuit board. The aforementioned signal lines 46 to 48 and parts of the wirings are provided on the circuit board. The second control circuit 51 is also mounted on the circuit board. Providing and/or mounting elements of the second controller 50 on the same single circuit board is merely an example.

As described above, the control power supply voltage generated by the power supply controller 22 in the first controller 20 is inputted to the second controller 50. The components, including the second control circuit 51, in the second controller 50 operate by the control power supply voltage inputted from the first controller 20.

A power supply controller similar to the power supply controller 22 may also be provided in the second controller 50, and the second controller 50 may operate by the control power supply voltage supplied from the power supply controller. In such case where the power supply controller is provided in the second controller 50, the power supply controller may be configured capable of supplying the control power supply voltage also to the first controller 20, and the power supply controller 22 in the first controller 20 may be omitted.

The second controller 50 also includes a first interrupter 52, a second interrupter 53, and a third interrupter 54. The first interrupter 52 is provided on the first signal line 46 and configured capable of making the first signal line 46 conductive/interrupted. The second interrupter 53 is provided on the second signal line 47 and configured capable of making the second signal line 47 conductive/interrupted. The third interrupter 54 is provided on the third signal line 48 and configured capable of making the third signal line 48 conductive/interrupted. The interrupters 52 to 54 are each controlled by the second control circuit 51.

The interrupters 52 to 54 each include a switching element provided on a corresponding signal line. When the switching element is turned ON, the signal line is made conductive, while when the switching element is turned OFF, the signal line is interrupted.

The switching elements in the interrupters 52 to 54 are each a semiconductor switching element, such as a MOSFET, in the present embodiment. However, these switching elements may each be one other than a semiconductor switching element, such as a contact relay. These switching elements may each be a so-called normally-open switching element, or may each be a so-called normally-closed switching element.

In a normal state, the second control circuit 51 keeps the interrupters 52 to 54 ON to make the signal lines 46 to 48 conductive, to thereby input the position signals from the rotor position detector 42 to the first control circuit 21. On the other hand, when an abnormality in rotation direction of the motor 41 is detected, the second control circuit 51 turns OFF the interrupters 52 to 54, to thereby interrupt the signal lines 46 to 48.

A more detailed description will be given of a function of monitoring the rotation direction of the motor 41 by the second control circuit 51. The second control circuit 51, to which the signal lines 46 to 48 are coupled, is configured to receive input of the position signals from the rotor position detector 42.

While the trigger switch 13 is ON, the second control circuit 51 detects the rotation direction of the motor 41 based on the three position signals inputted through the signal lines 46 to 48, and determines whether the detected rotation direction is the set rotation direction. In a case where the detected rotation direction is a reverse direction to the set rotation direction (hereinafter referred to as an "unintended direction"), the second control circuit 51 turns OFF all the interrupters 52 to 54 to interrupt all the signal lines 46 to 48, thereby interrupting input of the three position signals from the rotor position detector 42 to the first control circuit 21.

The trigger-ON signal Sa from the switch signal detector 23 is inputted to the second control circuit 51. Thus, the second control circuit 51 performs the aforementioned monitoring function while the trigger-ON signal Sa is inputted.

When the three signal lines 46 to 48 are interrupted, and the position signals are no longer inputted to the first control circuit 21, the above-described signal abnormal state occurs. Thus, when the three signal lines 46 to 48 are interrupted, and the signal abnormal state occurs, the first control circuit 21 stops driving of the motor 41.

That is, while the trigger switch 13 is ON, the second control circuit 51 monitors the rotation direction of the motor 41, and stops the motor 41 if the motor 41 rotates in the unintended direction. A specific method of stopping the motor 41 by the second control circuit 51 in the present embodiment is to interrupt the three signal lines 46 to 48 in the second controller 50 to thereby cause occurrence of the signal abnormal state.

It is merely an example that the second control circuit 51 determines the ON/OFF state of the trigger switch 13 based on whether the trigger-ON signal Sa is inputted. The second control circuit 51 may be able to recognize the ON/OFF state of the trigger switch 13 based on, for example, a signal other than the trigger-ON signal Sa. For example, the trigger switch 13 and the second control circuit 51 may be coupled to each other, thereby allowing the second control circuit 51 to detect whether the trigger switch 13 is ON not through the first controller 20.

(1-3) Motor Control Process

Next, a description will be given of a motor control process executed by the first control circuit 21 in the first controller 20 using FIG. 3. When started, the first control circuit 21 executes the motor control process shown in FIG. 3.

Figure 3:
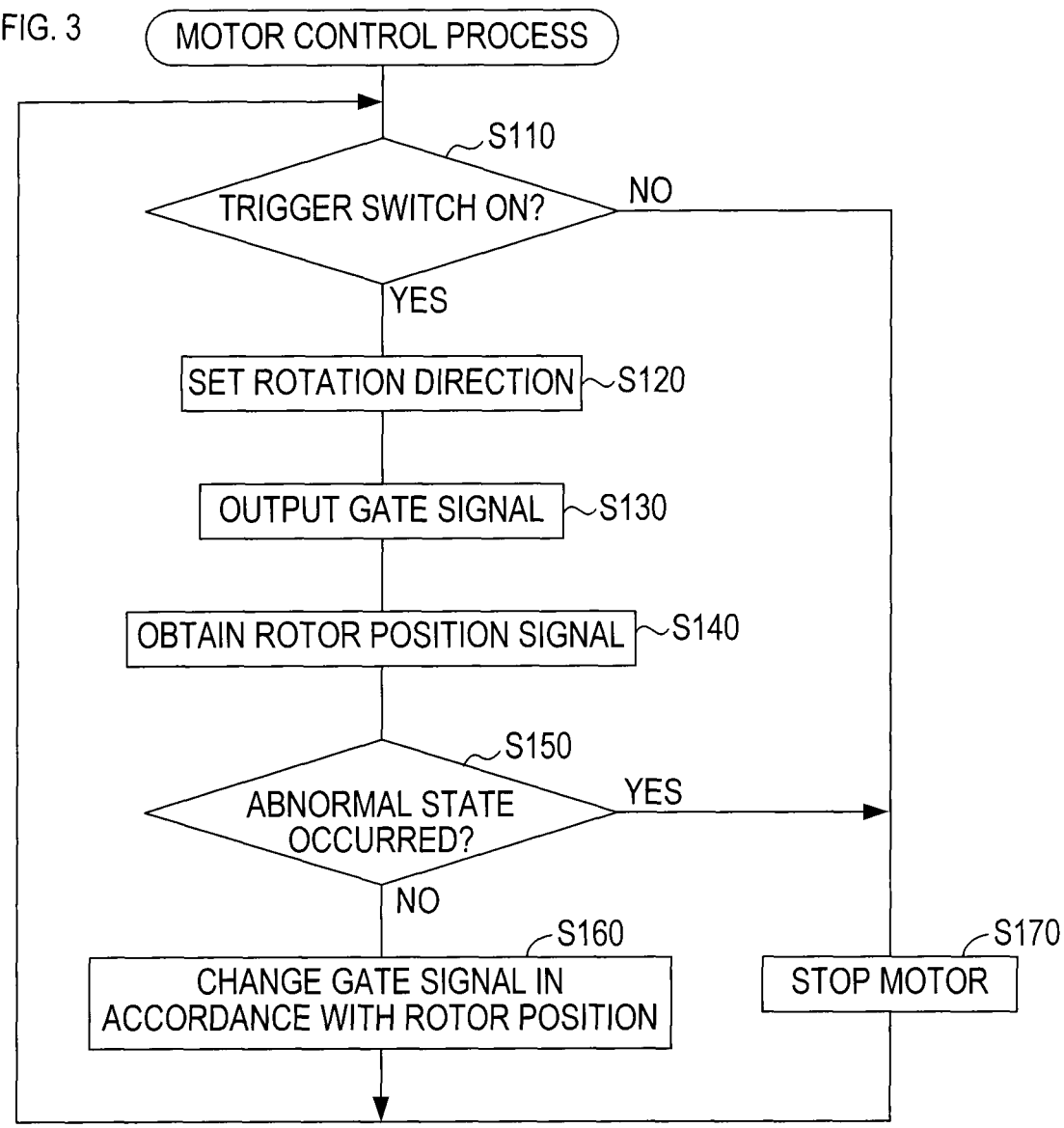
FIG. 3 is a flowchart showing a motor control process of the first embodiment.

After starting the motor control process in FIG. 3, the first control circuit 21 determines in S110 whether the trigger switch 13 is ON. Specifically, the determination is made based on whether the trigger-ON signal Sa is inputted from the switch signal detector 23.

If the trigger switch 13 is OFF, that is, the trigger-ON signal Sa is not inputted, then a process of stopping the motor 41 is executed in S170, and the process returns to S110. The process executed in S170 includes at least a process of turning OFF all of the semiconductor switching elements Q1 to Q6.

If the trigger switch 13 is ON in S110, that is, the trigger-ON signal Sa is inputted, then the process proceeds to S120. In S120, the rotation direction of the motor 41 is set. In the present embodiment, the rotation direction of the motor 41 is previously set to the set rotation direction. Thus, in S120, the rotation direction of the motor 41 is set to the set rotation direction.

In S130, gate signals are outputted to the drive circuit 30 such that the motor 41 rotates in the set rotation direction that has been set in S120. Specifically, to one of the three semiconductor switching elements Q1 to Q3, as the high-side switches, and to one of the three semiconductor switching elements Q4 to Q6, as the low-side switches, gate signals to turn ON the two semiconductor switching elements are outputted, thereby turning ON the two semiconductor switching elements. This causes the motor 41 to rotate in the set rotation direction.

If the gate signals are already outputted in the process of S130, then the output of the gate signals is continued.

In S140, a rotor position signal inputted from the signal lines 46 to 48 is obtained. The rotor position signal is a collective term for the three position signals, that is, the first position signal to the third position signal described above.

In S150, it is determined whether an abnormal state has occurred. If an abnormal state has not occurred, then the process proceeds to S160, while if an abnormal state has occurred, then the process proceeds to S170. The abnormal state here includes at least the above-described signal abnormal state in the present embodiment. Thus, in the present embodiment, if the signal abnormal state has occurred, then the process proceeds to S170, in which driving of the motor 41 is stopped.

If an abnormal state has not occurred, then output destinations of the gate signals, that is, semiconductor switching elements to be turned ON are computed in S160 in accordance with the rotor position based on the rotor position signal obtained in S140. In a case where the one high-side semiconductor switching element and the one low-side semiconductor switching element, which are currently ON, should be kept ON, the current output destinations of the gate signals are maintained. On the other hand, in a case where it is a time point to change at least one of the one high-side semiconductor switching element or the one low-side semiconductor switching element, which is currently ON, to another semiconductor switching element, the output destination of the gate signal is changed.

Subsequent to the process of S160, the process returns to S110.

(1-4) Abnormality Monitoring Process

Figure 4:
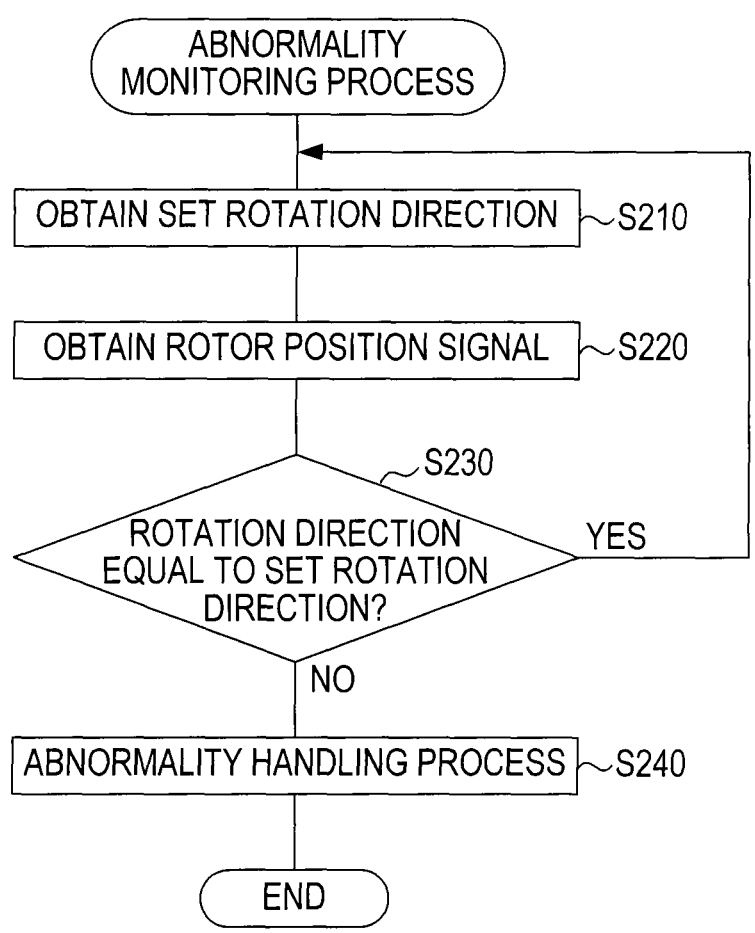
FIG. 4 is a flowchart showing an abnormality monitoring process of the first embodiment.

Next, a description will be given of an abnormality monitoring process executed by the second control circuit 51 in the second controller 50 using FIG. 4. When started, the second control circuit 51 executes the abnormality monitoring process when the trigger switch 13 is turned ON, that is, when the trigger-ON signal Sa is inputted.

When starting the abnormality monitoring process, the second control circuit 51 obtains the set rotation direction in S210. The set rotation direction may be obtainable from the first control circuit 21, or may be previously stored, for example, in the memory 51*b* in the second control circuit 51 and obtained from the memory 51*b*.

In S220, the rotor position signal inputted through the signal lines 46 to 48 is obtained. In S230, an actual rotation direction of the motor 41 is detected based on the rotor position signal obtained in S220, and it is determined whether the actual rotation direction is the same as the set rotation direction. If the actual rotation direction is the same as the set rotation direction, then the process returns to S210; if the actual rotation direction is the unintended direction, then the process proceeds to S240.

More specifically, the detection of the rotation direction based on the rotor position signal is performed in accordance with a changing state of the rotor position signal obtained in S220. Specifically, in the abnormality monitoring process, obtainment of the rotor position signal in S220 is repeatedly performed as long as a positive determination continues to be made in S230. Also, the rotor position signal obtained in S220 changes in accordance with changes in the rotational position of the motor 41. Thus, in S230, each time the rotor position signal obtained in S220 changes, the rotation direction of the motor 41 is detected based on the details of the change.

During a period after detecting the rotation direction based on a change in the rotor position signal until a next change in the rotor position signal, a state continues where the rotor position signal is constant. During the period, it is regarded in the process of S230 that the currently detected rotation direction is maintained.

In S240, an abnormal-time process is executed. Specifically, in the present embodiment, the first interrupter 52 to the third interrupter 54 are all turned OFF to thereby interrupt the three signal lines 46 to 48. This abnormal-time process leads to occurrence of a signal abnormal state.

As a result, when the abnormal-time process in S240 is executed, it is determined in S150 that an abnormal state has occurred in the motor control process executed by the first control circuit 21 in FIG. 3, and thereby driving of the motor 41 by the first control circuit 21 is stopped.

The abnormal-time process in S240, that is, interruption of the signal lines 46 to 48 by the interrupters 52 to 54, is continued until the trigger switch 13 is turned OFF. Thus, a user needs to at least bring the trigger operation portion 9 into a non-operated state to turn OFF the trigger switch 13, in order to rotate the motor 41 again.

(1-5) Effects of First Embodiment

According to the first embodiment as described above, the second control circuit 51 provided separately from the first control circuit 21 monitors the rotation direction of the motor 41. If rotation of the motor 41 in the unintended direction is detected, then the second control circuit 51 executes the abnormal-time process to stop the rotation of the motor 41. Specifically, in the first embodiment, input of the position signals from the rotor position detector 42 to the first control circuit 21 is interrupted, to thereby stop the motor 41.

Thus, according to the electric working machine 1 of the first embodiment, in a case where the motor 41 rotates in the unintended direction, various influences that might be caused by the rotation in the unintended direction can be reduced.

Also, the position signals outputted from the rotor position detector 42 are not only inputted to the first control circuit 21 to be used for controlling the motor 41, but also inputted to the second control circuit 51 to be used for detection of the rotation direction of the motor 41 by the second control circuit 51. Accordingly, the position signals from the rotor position detector 42 are used efficiently.

In particular, in the first embodiment, the position signals outputted from the rotor position detector 42 are first inputted to the second controller 50, and inputted to the first controller 20 through the second controller 50. If the motor 41 rotates in the unintended direction, output of the position signals from the second controller 50 to the first controller 20 is interrupted. Accordingly, interruption of the position signals to the first control circuit 21 by the second control circuit 51 can be achieved by a simple configuration.

The second control circuit 51 executes the abnormality monitoring process while a trigger-ON signal Sa is inputted, that is, while the trigger switch 13 is ON, and does not execute the abnormality monitoring process while the trigger switch 13 is OFF. Accordingly, electric power consumption while the trigger switch 13 is OFF can be reduced.

The battery 15 corresponds to one example of a power source in the present disclosure. The drive circuit 30 corresponds to one example of a driver in the present disclosure. The process of turning OFF the three interrupters 52 to 54 by the second control circuit 51 to corresponds to one example of an abnormality handling process in the present disclosure. The power supply controller 22 corresponds to one example of a power supplier in the present disclosure. The rotor position detector 42 corresponds to one example of a position information outputter in the present disclosure. The trigger operation portion 9 corresponds to one example of an instruction operation device in the present disclosure. The abnormal-time process corresponds to one example of the abnormality handling process in the present disclosure. The position signals outputted from the respective Hall sensors in the rotor position detector 42 correspond to one example of rotational position information in the present disclosure.

2. Second Embodiment

Figure 5:
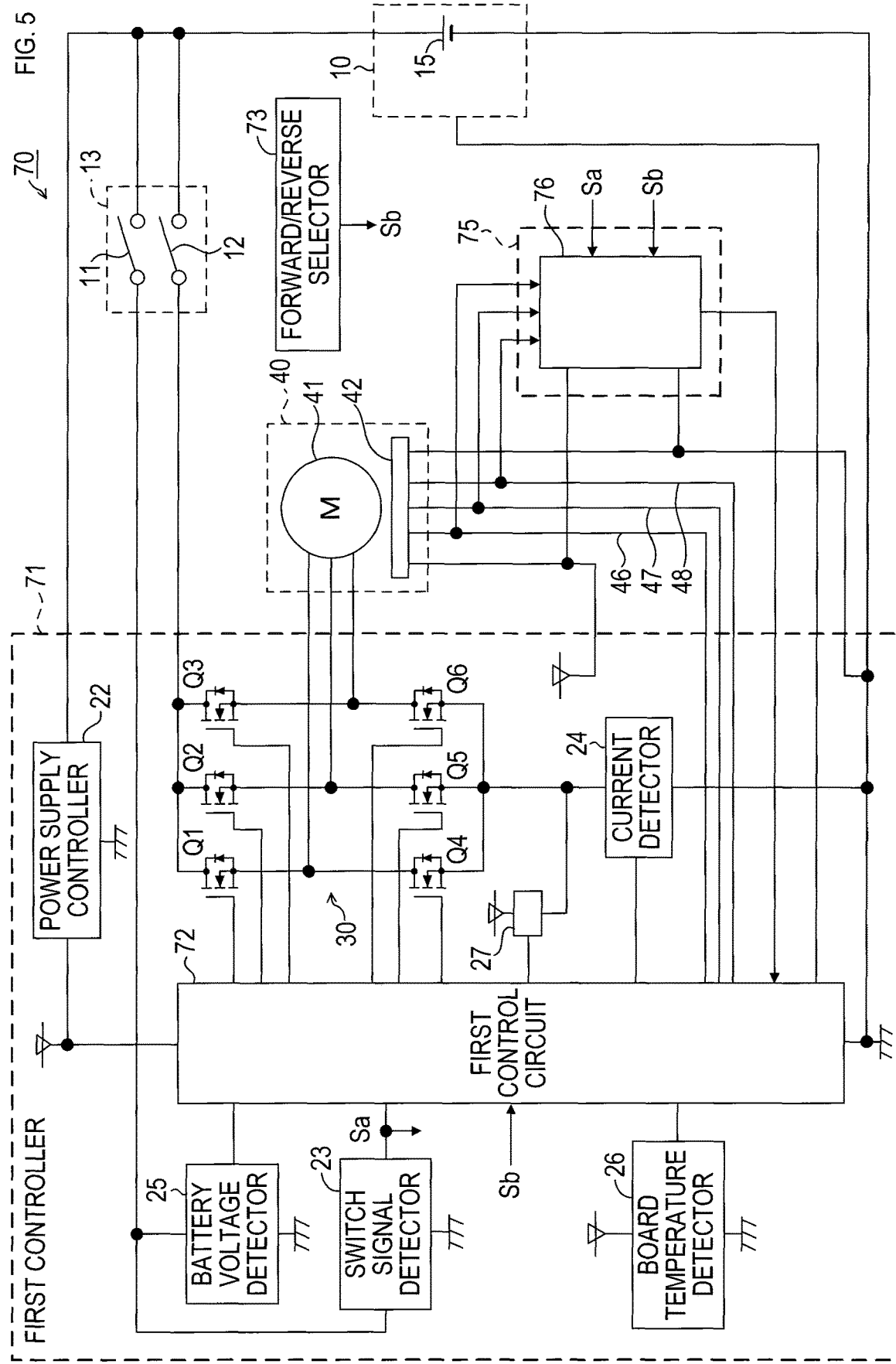
FIG. 5 is a configuration diagram showing an electrical configuration of an electric working machine of a second embodiment.

FIG. 5 shows an electric working machine 70 of a second embodiment. Unlike the first embodiment, the electric working machine 70 of the second embodiment is an electric working machine, such as an electric driver drill and an electric grass cutter, which allows a user to selectively change the rotation direction of the motor to either a forward direction or a reverse direction.

However, the electric working machine 70 of the second embodiment has an electrical configuration that is mostly the same as that of the first embodiment; thus, differences will be described below. Reference numerals identical to those in the first embodiment denote respective identical configurations, and previous description should be referred to.

In a similar manner to the electric working machine 1 of the first embodiment, the electric working machine 70 of the second embodiment is provided with the battery pack 10 attachable to and detachable from the main body, and is configured to be operable by the electric power of the battery 15 in the battery pack 10 attached to the main body. When the motor 41 rotates, its rotational driving force is transmitted through a not-shown transmission mechanism to a working element, thereby driving the working element. The working element included in the electric working machine 70 may be a tool bit in a case where the electric working machine 70 is, for example, an electric driver drill, or may be a disk-shaped cutting blade having a saw blade along an outer periphery thereof in a case where the electric working machine 70 is, for example, an electric grass cutter.

An electrical configuration of the electric working machine 70 of the second embodiment shown in FIG. 5 has mainly three differences below as compared with the electric working machine 1 of the first embodiment.

The first difference is that a second controller 75 does not include three signal lines 46 to 48, and no interrupter is provided to the three signal lines 46 to 48. However, a second control circuit 76 in the second controller 75 is coupled to each of the signal lines 46 to 48, and the rotor position signal from the rotor position detector 42 is inputted also to the second control circuit 76.

The second difference is that a forward/reverse selector switch 73 is provided. The forward/reverse selector switch 73 is a switch to be operated by a user to selectively change the rotation direction of the motor 41 to either the forward direction or the reverse direction, that is, to set the rotation direction to either the forward direction or the reverse direction. With respect to the rotation direction of the motor 41, it may be determined appropriately which direction should be defined as the forward direction and which direction should be defined as the reverse direction. The forward direction corresponds to one example of a first direction in the present disclosure, the reverse direction corresponds to one example of a second direction in the present disclosure, and the forward/reverse selector switch 73 corresponds to one example of a direction selecting operation device in the present disclosure.

The forward/reverse selector switch 73 outputs a rotation direction setting signal Sb. The rotation direction setting signal Sb is a signal indicating a state of the forward/reverse selector switch 73, that is, a signal indicating to which of the forward direction and the reverse direction the forward/reverse selector switch 73 is set by a user. The rotation direction setting signal Sb is inputted to a first control circuit 72 in a first controller 71 and to the second control circuit 76 in the second controller 75.

The third difference is that if detecting that an actual rotation direction of the motor 41 is the unintended direction, the second control circuit 76 in the second controller 75 outputs an abnormality signal to the first control circuit 72 in the first controller 71. The set rotation direction in the second embodiment is a rotation direction set by the forward/reverse selector switch 73.

The second control circuit 76 in the second controller 75 executes the abnormality monitoring process when the trigger switch 13 is turned ON, in a similar manner as in the first embodiment. However, in S210, the rotation direction indicated by the rotation direction setting signal Sb inputted from the forward/reverse selector switch 73 is obtained as the set rotation direction. Also, the abnormal-time process in S240 includes a notification process of providing a specific notification to the first control circuit 72. Specifically, in the notification process, an abnormality signal is outputted to the first control circuit 72. The processes in S220 and S230 are the same as those in the first embodiment.

When started, the first control circuit 72 in the first controller 71 executes the motor control process in FIG. 3 in a similar manner as in the first embodiment. However, in S120, a rotation direction indicated by the rotation direction setting signal Sb inputted from the forward/reverse selector switch 73 is set as the set rotation direction. Also, in the second embodiment, the abnormal state in S150 includes at least input of an abnormality signal from the second control circuit 76. Thus, in the second embodiment, if an abnormality signal is inputted from the second control circuit 76, then the process proceeds to S170, and driving of the motor 41 is stopped.

The abnormality signal outputted from the second control circuit 76 may be any type of signal. The abnormality signal may be, for example, a 1-bit or multi-bit digital signal. The abnormality signal may also be, for example, an analog signal. The specific notification to the first control circuit 72 may be performed in a manner different from outputting an abnormality signal. For example, in a case where the first control circuit 72 is provided with a reset signal input terminal to reset the CPU included in the first control circuit 72, the specific notification may be inputting a reset signal to the reset signal input terminal. When a reset signal is inputted to the first control circuit 72, the CPU is reset, and gate signals are all turned OFF; as a result, the motor 41 is stopped.

According to the second embodiment as described above, if rotation of the motor 41 in the unintended direction is detected, the second control circuit 76 executes an abnormality handling process. Specifically, an abnormality signal is outputted to the first control circuit 72. When the abnormality signal is inputted from the second control circuit 76, the first control circuit 72 stops the motor 41.

Accordingly, if the motor 41 rotates in the unintended direction, the motor 41 can be stopped by a simple process of outputting an abnormality signal to the first control circuit 72.

Also, regardless of whether the rotation direction is set to the forward direction or set to the reverse direction by the forward/reverse selector switch 73, the motor 41 can be stopped if rotation in the unintended direction is detected.

3. Third Embodiment

Figure 6:
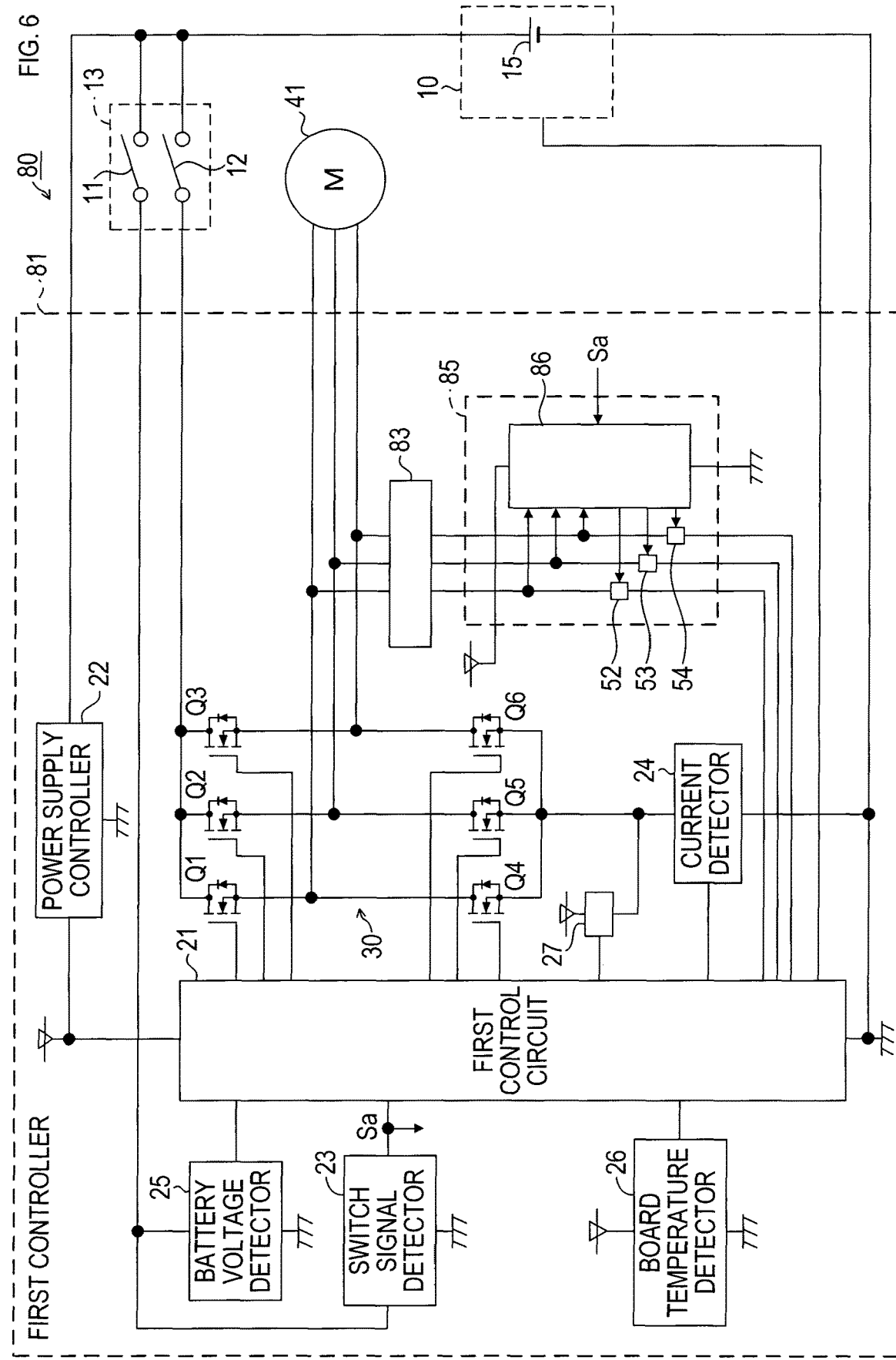
FIG. 6 is a configuration diagram showing an electrical configuration of an electric working machine of a third embodiment.

FIG. 6 shows an electric working machine 80 of a third embodiment. Since the electric working machine 80 of the third embodiment has a basic configuration similar to that in the first embodiment, differences will be described below. Reference numerals identical to those in the first embodiment denote respective identical configurations, and previous description should be referred to.

Compared with the electric working machine 1 of the first embodiment, the electric working machine 80 of the third embodiment has mainly two differences below.

The first difference is that a rotor position detector 83 is provided in a first controller 81, includes no Hall sensor, and is configured to generate a position detection signal for each phase based on a voltage value of a wiring of the phase for supplying three-phase power from the drive circuit 30 to the motor 41.

The second difference is that a second controller 85 is provided in the first controller 81. Specifically, in the first embodiment and the second embodiment, the first controller and the second controller are configured as separate controllers each having a circuit board, on which wiring and components are mounted. In contrast, in the third embodiment, the first controller 81 and the second controller 85 are mounted on the same single circuit board.

The rotor position detector 83 obtains the voltage values of the wirings of respective phases to supply three-phase power from the drive circuit 30 to the motor 41. The rotor position detector 83 performs a specified signal processing for each phase based on the obtained voltage value, and outputs a position detection signal. Then, the first control circuit 21 detects the rotational position of the motor 41 based on the position detection signals of the respective phases from the rotor position detector 83.

A specific method for generating position detection signals of the respective phases based on the obtained voltage values of the respective phases in the rotor position detector 83, and a specific method for detecting the rotation direction based on the position detection signals of the respective phases in the first control circuit 21 may be commonly used methods in a so-called sensor-less control of a brushless motor.

The position detection signals of the respective phases outputted from the rotor position detector 83 are inputted to the first control circuit 21 through the respective signal lines.

The second controller 85 has basically the same configuration as the second controller 50 of the first embodiment. Specifically, the second controller 85 includes parts of the three signal lines to transmit position detection signals of the respective phases from the rotor position detector 83 to the first control circuit 21. Similarly to the first embodiment, the first interrupter 52, the second interrupter 53, and the third interrupter 54 are provided to the respective signal lines.

A second control circuit 86 detects the rotation direction of the motor 41 based on the position detection signals of the respective phases outputted from the rotor position detector 83. If the detected direction is the unintended direction, the second control circuit 86 turns OFF the interrupters 52 to 54 to thereby interrupt input of the position detection signals to the first control circuit 21, similarly to the first embodiment. When inputs of the position detection signals are interrupted, a signal abnormal state occurs, and thus the first control circuit 21 stops the motor 41.

The second control circuit 86 in the second controller 85 executes the abnormality monitoring process when the trigger switch 13 is turned ON, in a similar manner as in the first embodiment. However, the rotor position signal obtained in S220 is the position detection signals in the respective three phases inputted from the rotor position detector 83.

In the electric working machine 80 of the third embodiment as described above, the sensor-less control using no sensing element, such as a Hall sensor, is employed for detection of the rotational position of the motor 41. The electric working machine 80 with such configuration also can achieve similar effects and operations as those in the first embodiment.

4. Fourth Embodiment

FIG. 7 shows an electric working machine 100 of a fourth embodiment. Since the electric working machine 100 of the fourth embodiment has a basic configuration similar to that in the first embodiment, differences will be described below. Reference numerals identical to those in the first embodiment denote respective identical configurations, and previous description should be referred to.

Compared with the electric working machine 1 of the first embodiment, the electric working machine 100 of the fourth embodiment has mainly five differences below.

The first difference is that a second controller 110 does not include the interrupters 52 to 54 to interrupt the signal lines 46 to 48.

The second difference is that, a control power supply interrupter 103 to interrupt a power supply wiring 113, which supplies the control power supply voltage from the power supply controller 22 to a first control circuit 102, is provided on the power supply wiring 113, among the plurality of electric wirings arranged in the electric working machine 100.

The third difference is that a gate signal interrupter 104 to interrupt gate signal wirings 114, which output gate signals from the first control circuit 102 to the semiconductor switching elements Q1 to Q6, is provided on the gate signal wirings 114, among a plurality of electric wirings arranged in the electric working machine 100. The gate signal wirings 114 correspond to one example of a control wiring in the present disclosure, and the gate signal corresponds to one example of a control signal in the present disclosure.

The fourth difference is that a drive power supply interrupter 105 to interrupt a drive wiring 115, which supplies a battery voltage from the battery 15 through the second contact 12 to the drive circuit 30, is provided on the drive wiring 115, among the plurality of electric wirings arranged in the electric working machine 100.

The fifth difference is that, in a case where the motor 41 rotates in the unintended direction, a second control circuit 111 in the second controller 110 turns OFF at least one of the control power supply interrupter 103, the gate signal interrupter 104, or the drive power supply interrupter 105, to thereby interrupt the wiring with the turned OFF interrupter.

For example, if the control power supply interrupter 103 is turned OFF, and thus the power supply wiring 113 is interrupted, the control power supply voltage is not inputted to the first control circuit 102, thereby bringing the first control circuit 102 into a non-operating state. As a result, all the semiconductor switching elements Q1 to Q6 in the drive circuit 30 are turned OFF, and the motor 41 is stopped.

Also, for example, if the gate signal interrupter 104 is turned OFF, and thus the gate signal wiring 114 is interrupted, all the semiconductor switching elements Q1 to Q6 in the drive circuit 30 are turned OFF, and the motor 41 is stopped.

Further, for example, if the drive power supply interrupter 105 is turned OFF, and thus the drive wiring 115 is interrupted, electric power from the battery is not supplied to the motor 41 regardless of whether or not the semiconductor switching elements Q1 to Q6 are ON, and thus the motor 41 is stopped.

In other words, if at least one of the control power supply interrupter 103, the gate signal interrupter 104, or the drive power supply interrupter 105 is turned OFF, the motor 41 is stopped. The control power supply interrupter 103, the gate signal interrupter 104, and the drive power supply interrupter 105 each correspond to one example of an interrupter in the present disclosure.

The control power supply interrupter 103 includes, for example, an MOSFET, inserted in the power supply wiring 113, and the MOSFET is configured to be turned ON/OFF by the second control circuit 111. It may be configured such that the power supply wiring 113 is interrupted when the MOSFET is turned ON, and the power supply wiring 113 is brought into conduction when the MOSFET is turned OFF. Also, the control power supply interrupter 103 is configured to be OFF while the control power supply voltage is not generated by the power supply controller 22, and to be ON while the control power supply voltage is generated.

The control power supply interrupter 103 may be configured not to be ON only because the control power supply voltage is generated, but to be ON while the trigger switch 13 is further ON. The control power supply interrupter 103 may also include a so-called normally-closed switch that is normally kept ON regardless of whether or not the control power supply voltage is generated. Alternatively, the control power supply interrupter 103 may include a so-called normally-open switch that is normally kept OFF.

The gate signal interrupter 104 and the drive power supply interrupter 105 also each include, for example, a semiconductor switching element, such as an MOSFET inserted in interruption target wirings. When started, the first control circuit 102 normally turns ON the interrupters 104, 105 to bring the respective interruption target wirings into conduction.

In the operation of the gate signal interrupter 104 and the drive power supply interrupter 105, control by the second control circuit 111 is prioritized over control by the first control circuit 102. Thus, even when the first control circuit 102 controls the gate signal interrupter 104 and the drive power supply interrupter to be ON, if the second control circuit 111 controls the gate signal interrupter 104 and the drive power supply interrupter 105 to be OFF, the control by the second control circuit 111 is prioritized, and thereby the gate signal interrupter 104 and the drive power supply interrupter 105 are turned OFF.

The gate signal interrupter 104 and the drive power supply interrupter 105 each may include a so-called normally-closed switch that is normally kept ON. In this case, the control of the gate signal interrupter 104 and the drive power supply interrupter 105 by the first control circuit 102 is unnecessary.

When the trigger switch 13 is turned ON, the second control circuit 111 in the second controller 110 executes the abnormality monitoring process, similarly to the first embodiment. However, in S240, a process of turning OFF at least one of the control power supply interrupter 103, the gate signal interrupter 104, or the drive power supply interrupter 105 is executed as an abnormal-time process. In the abnormal-time process, any one of the three interrupters 103 to 105 may be turned OFF. Also, two of the three interrupters 103 to 105 may be turned OFF, or all of these may be turned OFF.

When started, the first control circuit 102 in the first controller 101 executes a motor control process in FIG. 8. After starting the motor control process in FIG. 8, the first control circuit 102 determines in S310 whether the trigger switch 13 is ON, in the same manner as in S110 of FIG. 3.

If the trigger switch 13 is OFF, then a process of stopping the motor 41 is executed in S370, and the process returns to S310.

If the trigger switch 13 is ON, then the process proceeds to S320. In S320, the gate signal interrupter 104 and the drive power supply interrupter 105 are turned ON, to thereby bring the two interruption target wirings into conduction.

Processes in S330, S340, S350, and S360 are respectively the same as the processes in S120, S130, S140, and S160 in FIG. 3.

According to the fourth embodiment as described above, if the motor 41 rotates in the unintended direction, the motor 41 can be stopped by turning OFF at least one of the three interrupters 103 to 105.

Particularly, in the fourth embodiment, the motor 41 is stopped not through the control by the first control circuit 102 but through interruption of a specific electric wiring. If the power supply wiring 113, the gate signal wiring 114, or the drive wiring 115 is interrupted, electric conduction to the motor 41 is stopped regardless of the operation state of the first control circuit 102, and the motor 41 is stopped. Accordingly, even if the CPU in the first control circuit 102 runs out of control to be in an abnormal state where the drive circuit 30 cannot be controlled normally when rotation in the unintended direction is detected, the motor 41 can be stopped.

5. Other Embodiments

Although some embodiments of the present disclosure have been described above, the present disclosure is not limited to the above-described embodiments, but may be practiced with various modifications.

(5-1) In the first embodiment, the three interrupters 52 to 54 in the second controller 50 may be provided outside the second controller 50. In other words, the interrupters 52 to 54 may be provided anywhere in the corresponding signal lines 46 to 48 from the rotor position detector 42 to the first control circuit 21.

Alternatively, an interrupter may be provided in a supply path of the control power supply voltage from the first controller 20 to the rotor position detector 42. In this case, the second control circuit 51 may turn ON the interrupter in the supply path of the control power supply voltage, as the abnormal-time process, to interrupt supply of the control power supply voltage to the rotor position detector 42, thereby causing the signal abnormal state.

(5-2) The trigger switch 13 may have a single contact instead of the two contacts, or may have three or more contacts. That is, the trigger switch 13 may supply the battery voltage to the first controller 20 through a single current path or three or more current paths.

(5-3) The power supply controller 22 may receive input of information indicating ON/OFF of the trigger switch 13, and may generate the control power supply voltage in accordance with the ON/OFF of the trigger switch 13. For example, the power supply controller 22 may generate the control power supply voltage while the trigger switch 13 is ON, and stop generating the control power supply voltage while the trigger switch 13 is OFF.

The trigger switch 13 may be arranged in the current conduction path that couples the battery 15 and the power supply controller 22, to allow the battery voltage to be supplied to the power supply controller 22 while the trigger switch 13 is ON.

(5-4) Also, in the first embodiment, the second embodiment, and the fourth embodiment, the first controller 81 and the second controller 85 may be mounted on the same single circuit board similarly to the third embodiment. That is, elements of the two controllers, including the first control circuit and the second control circuit, may be mounted on the same single circuit board.

(5-5) The rotor position detector 42 shown in the first embodiment, the second embodiment, and the fourth embodiment, as well as the rotor position detector 83 shown in the third embodiment are merely examples of a position information detector to detect the rotational position of the motor 41. The position information detector may be configured to detect the rotational position of the motor 41 using, for example, a detection device other than a Hall sensor.

(5-6) The motor 41 may be a motor other than a brushless motor. The drive circuit 30 shown, for example, in FIG. 1 is merely an example of a driver to conduct current to the motor 41. Drivers having different configurations depending on types of the motor 41 may be employed.

For example, a brushed DC motor may be used for the motor 41, and an H-bridge circuit with four semiconductor switching elements may be used for the driver. Also, for example, the driver may include one semiconductor switching element provided in the current conduction path from the power source to the motor.

(5-7) The battery pack attachable to and detachable from the main body is merely an example. For example, a battery may be installed in the main body.

Also, a motor drive power source is not limited to the battery 15, but may be another power source. For example, alternating current power may be inputted from an external commercial power source, or the like, to drive the motor based on the alternating current power. In this case, the inputted alternating current power may be supplied directly to the motor, or the alternating current power may be converted by a converter into direct current power, and the converted direct current power may be supplied to the motor. Alternatively, the converted direct current power is further converted into alternating current power by an inverter, or the like, to be supplied to the motor.

(5-8) The circular saw of the first embodiment, and the electric driver drill or the electric grass cutter of the second embodiment are merely examples of an electric working machine to which the present disclosure is applicable. The present disclosure may be applied not only to the circular saw, the electric driver drill, and the electric grass cutter, but also to various electric working machines, such as electric power tools for gardening, masonry work, metalworking, and woodworking. More specifically, the present disclosure may be applied to various electric working machines, such as an electric hammer, an electric hammer drill, an electric drill, an electric driver, an electric wrench, an electric grinder, an electric reciprocating saw, an electric jigsaw, an electric cutter, an electric chainsaw, an electric planer, an electric nail gun (including a tacker), an electric hedge trimmer, an electric lawn mower, an electric lawn trimmer, an electric cleaner, an electric blower, an electric sprayer, an electric spreader, and an electric dust collector.

(5-9) A plurality of functions achieved by a single element in the aforementioned embodiments may be achieved by a plurality of elements, or a function achieved by a single element may be achieved by a plurality of elements. Also, a plurality of functions achieved by a plurality of elements may be achieved by a single element, or a function achieved by a plurality of elements may be achieved by a single element. Further, a part of a configuration in the aforementioned embodiments may be omitted.

Moreover, at least a part of an element included in one of the aforementioned embodiments may be added to, or may replace, another one of the aforementioned embodiments. For example, in a case where the electric working machine 1 of the first embodiment is configured as an electric working machine, such as an electric driver drill or an electric grass cutter, in which the rotation direction of the motor is selectively changeable between a forward direction and a reverse direction, the electric working machine 1 may include the forward/reverse selector switch 73 shown in the second embodiment. Further, for example, the second embodiment and the third embodiment may employ at least one of the three interrupters 103, 104, 105 shown in the fourth embodiment.

The invention claimed is:

1. An electric working machine comprising:
    a trigger switch;
    a saw blade;
    a motor operably connected to the saw blade so as to drive the saw blade;
    a drive circuit operably connected to the motor, to the trigger switch, and to a battery so as to drive the motor by electric power supplied from the battery in response to turning ON of the trigger switch;
    a rotor position detector configured to detect a rotor position of the motor and configured to output a first position signal;
    a first control circuit configured to receive the first position signal, the first control circuit being operably connected to the drive circuit so as to control the drive circuit such that the motor rotates in a set rotation direction, the first control circuit being configured to control the drive circuit based on the first position signal to thereby rotate the motor in the set rotation direction;
    a first signal line that connects the rotor position detector to the first control circuit, the first signal line being configured to receive the first position signal from the rotor position detector, the first signal line being configured to output, to the first control circuit, the first position signal received from the rotor position detector; and
    a second control circuit having an input connected to the first signal line and having an output connected to one of the first control circuit or the first signal line, the second control circuit being configured to receive the first position signal from the first signal line, the second control circuit being configured to detect a rotation direction of the motor based on the first position signal received from the first signal line, and the second control circuit being configured to perform an abnormality handling process and provide an output signal via the output to the one of the first control circuit or the first signal line to stop rotation of the motor in response to a situation where the rotation direction detected by the second control circuit is reverse to the set rotation direction.

2. The electric working machine according to claim 1, further comprising:
    a trigger operation portion operably connected to the trigger switch and configured to be operated by an operator of the electric working machine to rotate the motor,
    wherein the first control circuit and the second control circuit are operably connected to the trigger operation portion via the trigger switch and configured so as to operate in response to an operation of the trigger operation portion.

3. An electric working machine comprising:
    a motor;
    a drive circuit operably connected to a power source and to the motor so as to drive the motor;
    a rotor position detector configured to detect a rotor position of the motor and configured to output a first position signal;
    a first control circuit configured to receive the first position signal, the first control circuit being operably connected to the drive circuit so as to control the drive circuit such that the motor rotates in a set rotation direction, the first control circuit being configured to control the drive circuit based on the first position signal to thereby rotate the motor in the set rotation direction;
    a first signal line that connects the rotor position detector to the first control circuit, the first signal line being configured to receive the first position signal from the rotor position detector, the first signal line being configured to output, to the first control circuit, the first position signal received from the rotor position detector; and
    a second control circuit having an input connected to the first signal line and having an output connected to one of the first control circuit or the first signal line, the second control circuit being configured to receive the first position signal from the first signal line, the second control circuit being configured to detect a rotation direction of the motor based on the first position signal received from the first signal line, and the second control circuit being configured to perform an abnormality handling process and provide an output signal via the output to the one of the first control circuit or the first signal line to stop rotation of the motor in response to a situation where the detected rotation direction is reverse to the set rotation direction.

4. The electric working machine according to claim 3, wherein the output of the second control circuit is connected to the first control circuit, and the abnormality handling process includes a notification process of providing a specific notification to the first control circuit, and
    wherein the first control circuit is configured to stop rotation of the motor through the drive circuit in response to execution of the notification process.

5. The electric working machine according to claim 3, comprising:
    a first controller including the first control circuit; and
    a second controller including the second control circuit and a part of the first signal line,
    wherein the input of the second control circuit is connected to the part of the first signal line and the output is connected to the part of the first signal line,
    wherein the first control circuit is configured to stop driving of the motor by the drive circuit in response to stopping of input of the first position signal from the first signal line, and
    wherein the abnormality handling process includes a process of allowing input of the first position signal from the first signal line to the second control circuit, while blocking input of the first position signal from the first signal line to the first control circuit.

6. The electric working machine according to claim 3, further comprising:
a direction selecting operation device operably connected to the first control circuit and the second control circuit and configured to be operated to set the rotation direction of the motor to a first direction or a second direction,
wherein the set rotation direction corresponds to the rotation direction set by the direction selecting operation device.

7. An electric working machine comprising:
a motor;
a drive circuit operably connected to a power source and to the motor so as to drive the motor;
a rotor position detector configured to detect a rotor position of the motor and configured to output a first position signal;
a first controller including the drive circuit and a first control circuit, the first control circuit being connected to the rotor position detector via a first signal line so as to receive the first position signal, the first control circuit being operably connected to the drive circuit so as to control the drive circuit, the first control circuit being configured to control the drive circuit based on the first position signal to thereby rotate the motor in a set rotation direction, the first control circuit being configured to stop driving of the motor by the drive circuit in response to termination of reception of the first position signal by the first control circuit; and
a second controller including a second control circuit and a part of the first signal line, the second control circuit being connected to the first signal line so as to receive the first position signal and configured to provide an output to the part of the first signal line, the second control circuit being programmed to perform:
a first function of detecting a rotation direction of the motor based on the first position signal, and
a second function of terminating output of the first position signal from the second controller to the first controller to thereby stop rotation of the motor, in response to a situation where the rotation direction detected by the first function is reverse to the set rotation direction.

* * * * *